US 8,769,070 B2

(12) United States Patent
Joshi et al.

(10) Patent No.: US 8,769,070 B2
(45) Date of Patent: Jul. 1, 2014

(54) SAS DOMAIN MANAGEMENT AND SSP DATA HANDLING OVER ETHERNET

(75) Inventors: Mandar Dattatraya Joshi, Pune (IN); Kaushalender Aggarwal, Pune (IN); Saurabh Balkrishna Khanvilkar, Thane (IN)

(73) Assignee: Netapp, Inc., Sunnyvale, CA (US)

(*) Notice: Subject to any disclaimer, the term of this patent is extended or adjusted under 35 U.S.C. 154(b) by 259 days.

(21) Appl. No.: 12/895,145

(22) Filed: Sep. 30, 2010

(65) Prior Publication Data

US 2011/0231571 A1    Sep. 22, 2011

Related U.S. Application Data

(60) Provisional application No. 61/315,553, filed on Mar. 19, 2010.

(51) Int. Cl.
*G06F 15/173* (2006.01)

(52) U.S. Cl.
USPC ........................................................ 709/223

(58) Field of Classification Search
USPC ......... 709/223, 224, 225, 229, 230, 236, 246; 370/466; 710/8, 306, 315
See application file for complete search history.

(56) References Cited

U.S. PATENT DOCUMENTS

| 7,412,631 B2 * | 8/2008 | Uddenberg et al. .......... 714/47.1 |
| 7,886,105 B2 * | 2/2011 | Stevens ......................... 710/313 |
| 8,219,719 B1 * | 7/2012 | Parry et al. ........................ 710/8 |
| 2006/0031612 A1 * | 2/2006 | Bashford et al. ................ 710/74 |
| 2006/0039406 A1 * | 2/2006 | Day et al. ....................... 370/469 |
| 2006/0041691 A1 * | 2/2006 | Bashford et al. .................. 710/8 |
| 2006/0080671 A1 * | 4/2006 | Day et al. ....................... 719/314 |
| 2006/0101171 A1 * | 5/2006 | Grieff et al. ..................... 710/36 |
| 2006/0194386 A1 * | 8/2006 | Yao et al. ...................... 438/257 |
| 2007/0005862 A1 * | 1/2007 | Seto ............................. 710/300 |
| 2007/0064623 A1 * | 3/2007 | Brahmaroutu ................ 370/254 |
| 2007/0088917 A1 * | 4/2007 | Ranaweera et al. ........... 711/148 |
| 2007/0093124 A1 * | 4/2007 | Varney et al. ................. 439/499 |
| 2007/0121668 A1 * | 5/2007 | Moretti et al. ................ 370/465 |
| 2007/0214303 A1 * | 9/2007 | Bashford et al. .............. 710/314 |
| 2008/0005620 A1 * | 1/2008 | Walker ............................ 714/43 |
| 2008/0091933 A1 * | 4/2008 | Marks et al. ..................... 713/2 |
| 2008/0228897 A1 * | 9/2008 | Ko ................................. 709/213 |
| 2009/0003361 A1 * | 1/2009 | Bakthavathsalam .......... 370/401 |
| 2009/0007155 A1 * | 1/2009 | Jones et al. .................... 719/327 |
| 2009/0037638 A1 * | 2/2009 | Izuta et al. ..................... 710/316 |
| 2009/0217081 A1 * | 8/2009 | Maharana et al. ................ 714/4 |
| 2009/0248889 A1 * | 10/2009 | Dickens et al. ............... 709/232 |
| 2011/0289233 A1 * | 11/2011 | Dickens et al. ............... 709/236 |
| 2011/0314141 A1 * | 12/2011 | Jibbe et al. .................... 709/224 |

* cited by examiner

*Primary Examiner* — Lashonda Jacobs
(74) *Attorney, Agent, or Firm* — Haynes and Boone, LLP

(57) ABSTRACT

A server application is executed on an active device within the SAS domain, the active device connected to a remote client via an Ethernet connection. At least one command is received from the remote client via the Ethernet connection. An Ethernet frame of the at least one command is converted to at least one SAS frame. The at least one SAS frame is routed via a SAS data path to a SAS target device connected to the active device, the SAS target device corresponding to a field of the command.

17 Claims, 3 Drawing Sheets

SAS DOMAIN MANAGEMENT AND SSP DATA HANDLING OVER ETHERNET

CROSS-REFERENCE TO RELATED APPLICATIONS

The present application claims priority under 35 U.S.C. §119(e) to U.S. Provisional Application Ser. No. 61/315,553, filed Mar. 19, 2010, entitled "SAS DOMAIN MANAGEMENT AND SSP DATA HANDLING OVER ETHERNET"; which is incorporated herein by reference.

TECHNICAL FIELD

The present disclosure generally relates to the field of Small Computer System Interface (SCSI) networks, and more particularly to a system, method, and device for providing remote communications to a Serial Attached SCSI (SAS) domain.

BACKGROUND

In data storage systems, it is often necessary for an administrator to monitor and manage the various devices within the network. Existing methods for such management include a specialized communications such as a serial port, an inter-integrated circuit port, JTAG port (IEEE 1149.1), or parallel (IEEE 1284) port. Such out of band (OOB) methods have inherent limitations for managing the network.

SUMMARY

A method for data communication in a Serial Attached Small Computer System Interface (SAS) domain includes, but is not limited to executing a server application on an active device within the SAS domain, the active device connected to a remote client via an ethernet connection, receiving at least one Internet Protocol Suite command from the remote client via the ethernet connection, converting an ethernet frame of at least one command to at least one SAS frame, and routing the at least one SAS frame via a SAS data path to a SAS target device connected to the active device, the SAS target device corresponding to a field of the command.

A system for data communication in a Serial Attached Small Computer System Interface (SAS) domain includes, but is not limited to, means for connecting an active device within the SAS domain to a remote client via an ethernet connection, means for executing a server application on the active device, means for receiving an Internet Protocol Suite command from the client via the ethernet connection, means for converting an ethernet frame of the command to at least one SAS frame, means for routing the at least one SAS frame via a SAS data path to a SAS target device corresponding to a field of the command.

A Serial Attached Small Computer System Interface (SAS) device includes, but is not limited to a network interface configured for connecting to an Ethernet network for communications with a remote client, a memory for storing computer executable code configured to operate a server application, a processor for executing the server application, and a bus communicatively coupled with the network interface, the memory, the processor, and at least one SAS data path for data communications with other SAS devices via the bus, wherein the server application is configured to convert at least one Ethernet frame from the remote client received via the ethernet connection to at least one SAS frame, the server application is configured to route the converted at least one SAS frame over one of the at least one SAS data path to a SAS target corresponding to a field of the data communications.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
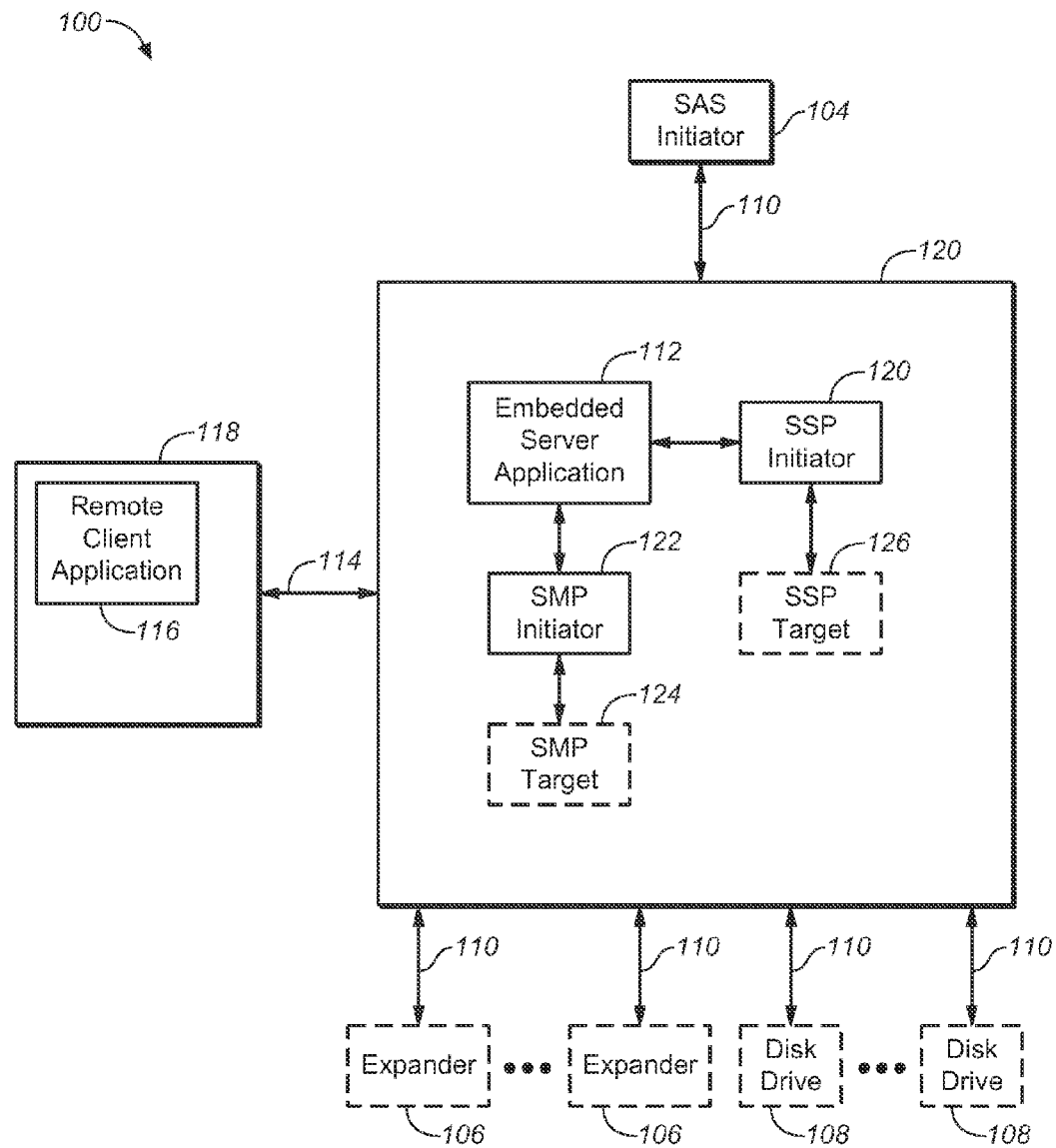
FIG. 1 is a block diagram of a SAS domain system including a SAS device in accordance with the present disclosure.

Referring generally to FIG. 1, a networked storage domain 100 is shown. For example, the transport protocol of the domain may be a Small Computer System Interface (SCSI) protocol implemented over a network capable media transport protocol, such as Serial Attached SCSI (SAS). For example, networked storage domain 100 may be a set of SAS devices that communicate with one another via SAS.

The networked storage domain (ex—SAS domain) 100 may include an active device 102 within the networked storage domain. For example, the active device 102 may be a SAS expander. Networked storage domain 100 may further include additional SAS devices, such as SAS initiator 104, other SAS expanders 106, and other SAS targets (ex—disk drives 108). SAS initiator 104, SAS expanders 106, and SAS targets 108 may be communicatively coupled to active device 102 via SAS links 110.

The active device 102 may execute an embedded server application 112. Active device 102 may further include one or more Serial SCSI Protocol (SSP) targets 124 (ex—SAS disk drives, SATA disk drives) or may include one or more Serial Management Protocol (SMP) targets 126 (ex—SAS Expanders). Active device 102 may further include a network interface for connecting to an Ethernet network. Server application 112 may transmit and receive data from a remote client application 116 via an Ethernet link 114. For example, the remote client application 116 may be executed by an information handling device 118 (ex—computer, personal digital assistant, smart phone, cellular telephone). User Input to and user output from remote client application 116 may utilize a Graphical User Interface (GUI). Ethernet link 114 may permit communications with SAS domain 100 from any Internet-enabled location or Internet-enabled device.

Remote client application 116 may send commands utilizing an Internet Protocol Suite (also called Transmission Control Protocol/Internet Protocol, or TCP/IP) protocol. These commands may be encoded as one or more Ethernet frames and may include data. These Ethernet frames may be custom formatted for communications between the remote client application 116 and server application 112. Further, the handshake methodology may be custom formatted for communications between the remote client application 116 and server application 112. Communications between remote client 116 and server application 112 may be secure. Communications between remote client 116 and server application 112 may utilize a unique port number. The unique port number may be assigned by the Internet Assigned Numbers Authority (IANA).

Server application 112 may receive commands from remote client application 116 and convert the Ethernet frames of the commands into one or more SAS frames. Server application 112 may route the converted SAS frames to the appropriate SAS target via a SAS data path. For example, the appropriate SAS target may correspond to a field of the command. Active device 102 may further include a SMP initiator 120 or a SSP initiator 122. If the SAS target of the command is a SMP target (ex—SAS expander), the SAS data path may include SMP initiator 120. If the SAS target of the command is a SSP target (ex—SAS disk drive), the SAS data path may include SSP initiator 122. Further, communications between server application 112 and remote client application 116 may be utilized for simultaneous SMP and SSP communications. For example, server application 112 may communicate information from remote client application 116 to both one or more of SAS expanders 106 and one or more of SAS targets 108. Server application may route the converted SAS frames to one or more of SAS expanders 106 via SMP initiator 120 and one or more of SAS targets 108 via SSP initiator 122.

Server application 112 may further receive a response via a second data path from the SAS target of the command. The response may include data. The second data path may be identical to the SAS data path utilized for routing the converted SAS frames. The response may be encoded as one or more SAS frames. Server application 112 may convert the SAS frames of the response into one or more Ethernet frames. Server application 112 may then transmit the converted Ethernet frames to the remote client application 116 via the Ethernet link 114.

Communications between server application 112 and remote client application 116 may be utilized for either SMP or SSP communications. Communications between server application 112 and remote client application 116 may be utilized for management of the SAS domain 100. Management of the SAS domain may include monitoring the SAS domain (ex—gathering discovery data) or controlling the SAS domain (ex—setting zone tables). Management of the SAS domain may include out-of-band management. Further, communications between server application 112 and remote client application 116 may be utilized for SSP data transfer. Further, communications between server application 112 and remote client application 116 may be utilized for downloading configuration pages or upgrading firmware.

Figure 2:
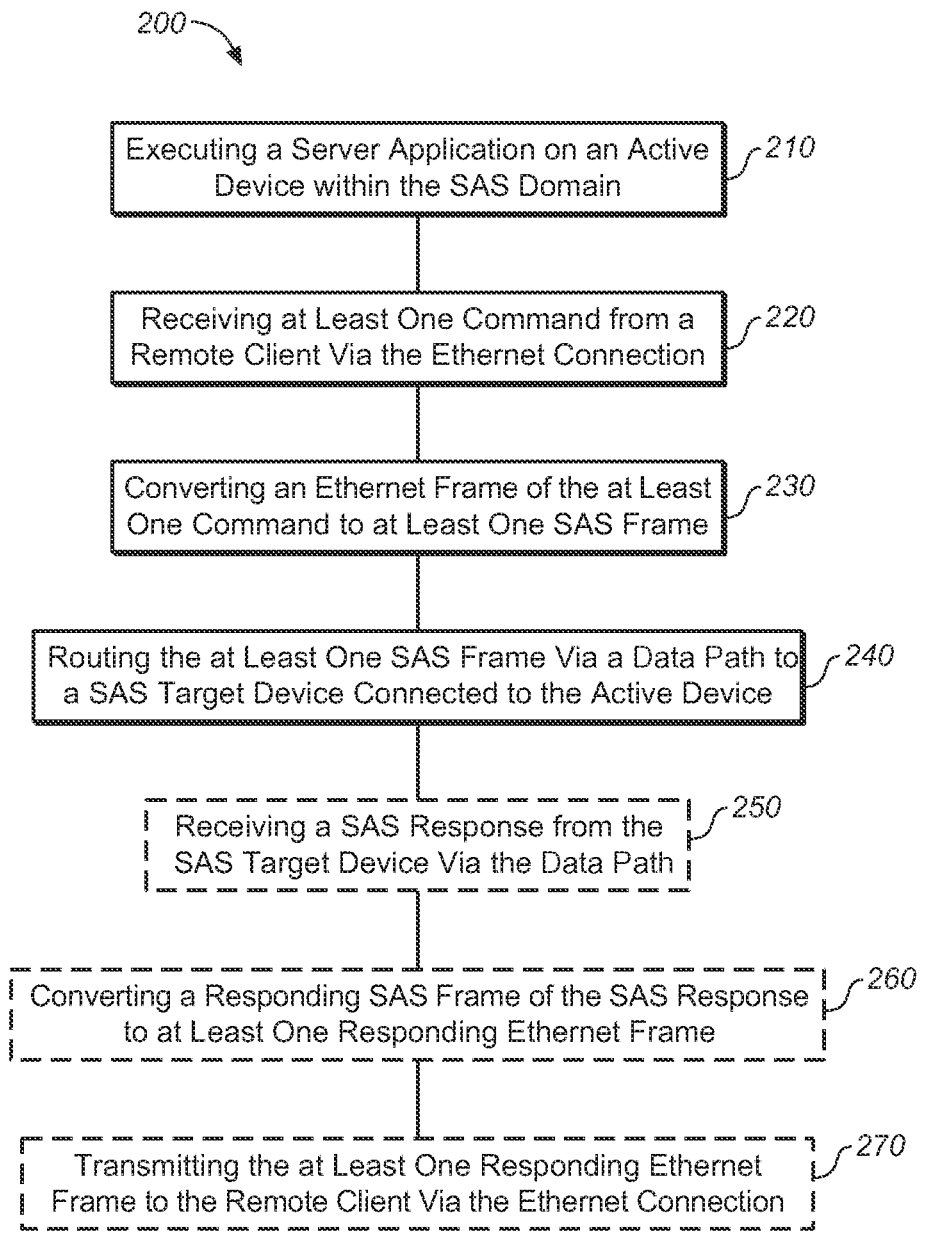
FIG. 2 is a flowchart diagram of a method for data communications with a SAS domain as implemented by/in accordance with the present disclosure.

Referring generally to FIG. 2, a flowchart illustrating a method for communications with a SAS domain 100 is shown. Active device 102 may be configured to perform the method 200. The method 200 may include a block 210 representing executing a server application on an active device within the SAS domain. For example, the active device 102 may be communicatively coupled to a remote client 118 via an Ethernet connection 114. The active device 102 may be a SAS expander. The method 200 may further include a block 220 representing receiving at least one command from the remote client via the Ethernet connection. The method 200 may further include a block 230 representing converting an Ethernet frame of the at least one command to at least one SAS frame. The method 200 may further include a block 240 representing routing the at least one SAS frame via a SAS data path to a SAS target device connected to the active device. For example, the SAS data path may include at least one or more of a SMP initiator 122 or a SSP initiator 120. The SAS target device may correspond to a field of the command. The SAS target device (ex—106, 108, 124, 126) may be external to the active device or may be included within the active device. Communications with the SAS domain may be utilized for out-of-band management of the SAS domain.

The method 200 may further include a block 250 representing receiving a SAS response from the SAS target device (ex—106, 108, 124, 126) via the SAS data path. The method 200 may further include a block 260 representing converting a responding SAS frame of the SAS response to at least one responding Ethernet frame. The method 200 may further include a block 270 representing transmitting the at least one responding Ethernet frame to the remote client via the Ethernet connection 114.

Figure 3:
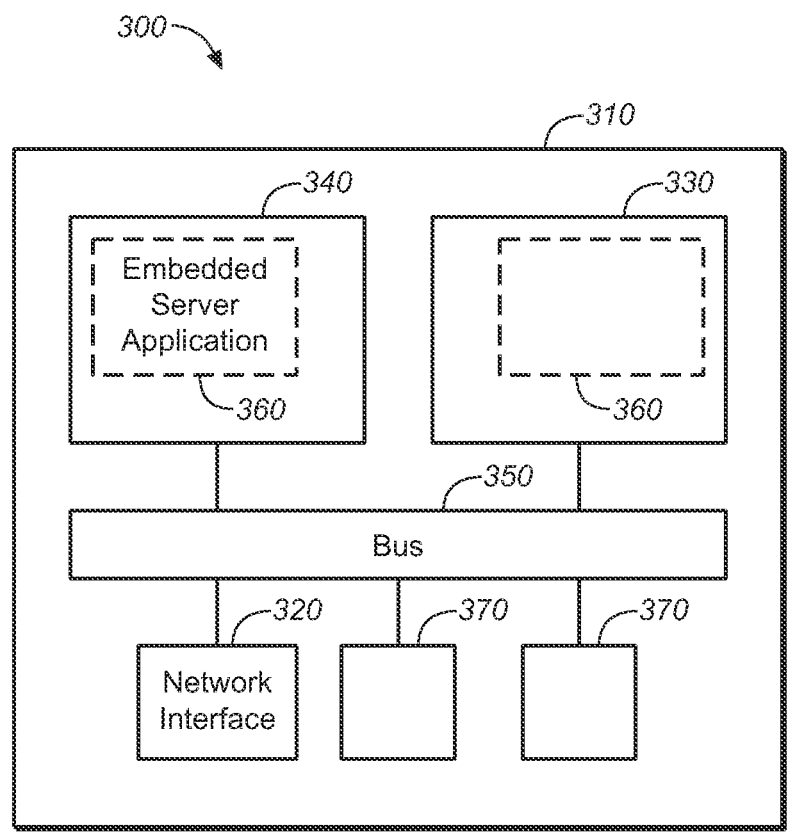
FIG. 3 is a block diagram illustrating a SAS device in accordance with the present disclosure.

Referring generally to FIG. 3, a diagram 300 illustrating SAS device 310 is shown. SAS device may be active device 110. SAS device may include network interface 320. Network interface 320 may be configured for connecting to an Ethernet network for communications with a remote client (ex—information handling device 118). SAS device may further include memory 330. Memory 330 may store computer executable code configured to operate a server application (ex—embedded server application 112). SAS device 310 may further include processor 340. SAS device 310 may further include bus 350. Bus 350 may be communicatively coupled with the network interface, the memory, the processor, and at least one SAS initiator for providing communications between the server application and other SAS devices.

Processor 340 may execute the server application 360. The server application may be configure to convert at least one Ethernet frame from the remote client to at least SAS frame. The at least one Ethernet frame may be received via the Ethernet connection 114. Further, the server application may be configured to route the converted at least one SAS frame over one of the at least one SAS initiator to a SAS target (ex—one or more of 106, 108, 124, 126. The SAS target may correspond to a field of the communications with the remote client. An at least one SAS data path may include an SAS initiator 370 such as a SMP initiator 122 or a SSP initiator 120.

The server application may receive a response from the SAS target. The response may include at least one SAS frame. The server application may convert the at least one SAS frame to at least one Ethernet frame. Further, the server application may transmit the converted at least one Ethernet frame to the remote client. The SAS target may be external to the SAS device. In another embodiment, the SAS target may be located within the SAS device.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for data communication in a Serial Attached Small Computer System Interface (SAS) domain, comprising:
   designating a unique port number for communicating with the SAS domain via an Ethernet connection;
   executing a server application on an active device within the SAS domain, the active device connected to a remote client via the Ethernet connection;
   receiving at least one Internet Protocol Suite command from the remote client via the Ethernet connection, wherein the received at least one Internet Protocol Suite command utilizes the unique port number;
   converting an Ethernet frame of the at least one Internet Protocol Suite command to at least one SAS frame for out-of-band management within the SAS domain;
   routing the at least one SAS frame via a SAS data path to a SAS target device connected to the active device, the SAS target device corresponding to a field of the Internet Protocol Suite command; and
   utilizing the data communication for out-of-band management of the SAS target device.

2. The method of claim 1, wherein the active device is a SAS expander.

3. The method of claim 1, further including:
   receiving a SAS response from the SAS target device via the SAS data path;
   converting a responding SAS frame of the SAS response to at least one responding Ethernet frame;
   transmitting the at least one responding Ethernet frame to the remote client via the Ethernet connection.

4. The method of claim 1, wherein the SAS data path includes at least one of a Serial Management Protocol (SMP) Initiator or a Serial Small Computer System Interface Protocol (SSP) Initiator.

5. The method of claim 1, wherein the SAS target device is external to the active device.

6. The method of claim 1, wherein the active device includes the SAS target device.

7. A system for data communication in a Serial Attached Small Computer System Interface (SAS) domain, comprising:
   means for connecting an active device within the SAS domain to a remote client via an the Ethernet connection by communicating between the active device and the remote client utilizing a unique port number designated for SAS communication over Ethernet;
   means for executing a server application on the active device;
   means for receiving an Internet Protocol Suite command from the client via the Ethernet connection utilizing the unique port number;
   means for converting an Ethernet frame of the Internet Protocol Suite command to at least one SAS frame that performs out-of-band management within the SAS domain;
   means for routing the at least one SAS frame via an SAS data path to a SAS target device corresponding to a field of the Internet Protocol Suite command; and
   means for utilizing the data communication for out-of-band management of the SAS target device.

8. The system of claim 7, wherein the active device is a SAS expander.

9. The system of claim 7, further including:
   means for receiving a SAS response from the SAS target device via the SAS data path;
   means for converting a responding SAS frame of the SAS response to at least one responding Ethernet frame;
   means for transmitting the at least one responding Ethernet frame to the remote client via the Ethernet connection.

10. The system of claim 7, wherein the SAS data path includes at least one of a Serial Management Protocol (SMP) Initiator or a Serial Small Computer System Interface Protocol (SSP) Initiator.

11. The system of claim 7, wherein the SAS target device is external to the active device.

12. The system of claim 7, wherein the active device includes the SAS target device.

13. A Serial Attached Small Computer System Interface (SAS) device, comprising:
   a network interface configured for connecting to an Ethernet network for communications with a remote client utilizing a unique port number designated for SAS communication over an Ethernet connection;
   a memory for storing computer executable code configured to operate a server application;
   a processor for executing the server application; and
   a bus communicatively coupled with the network interface, the memory, the processor, and at least one SAS initiator for data communications with other SAS devices via the bus;
   wherein the server application is configured to:
     convert at least one Ethernet frame of an Internet Protocol Suite command from the remote client received via the network interface to at least one SAS frame including an instruction for out-of-band management of an SAS device,
     route the converted at least one SAS frame over one of the at least one SAS initiator to a SAS target corresponding to a field of the data communications, and
     utilize the routed at least one SAS frame to perform out-of-band management of the SAS target.

14. The SAS device of claim 13, wherein the at least one SAS initiator includes at least one of a Serial Management Protocol (SMP) Initiator or a Serial Small Computer System Interface Protocol (SSP) Initiator.

15. The SAS device of claim 13, wherein the server application converts at least one responsive SAS frame from the SAS target received via a responsive data path of the at least one SAS data path to at least one responsive TCP/IP frame, the server application instructs the processor to route the converted at least one SAS frame over the network interface to the remote client.

16. The SAS device of claim 13, further including the SAS target.

17. The SAS expander of claim 13, wherein the SAS target is external to the SAS device.

* * * * *